United States Patent [19]
Bregman et al.

[11] Patent Number: 5,093,890
[45] Date of Patent: Mar. 3, 1992

[54] OPTICAL BUS FOR COMPUTER SYSTEMS

[75] Inventors: Mark F. Bregman, Ridgefield, Conn.;
Ismail C. Noyan, Peekskill, N.Y.;
Mark B. Ritter, Brookfield, Conn.;
Harold S. Stone, Chappaqua, N.Y.

[73] Assignee: International Business Machines Corporation, Armonk, N.Y.

[21] Appl. No.: 618,768

[22] Filed: Nov. 27, 1990

[51] Int. Cl.⁵ .................................. G02B 6/14
[52] U.S. Cl. .................................. 385/146; 359/109
[58] Field of Search .................... 350/96.10, 96.15; 455/613, 614, 615

[56] References Cited

U.S. PATENT DOCUMENTS 4,063,083 12/1977 Cathey et al. ................ 455/613
4,400,054 8/1983 Biard et al. ................... 350/96.15
4,838,630 6/1989 Jannson et al. ............... 350/96.15

Primary Examiner—Frank Gonzalez
Assistant Examiner—Phan T. Heartney
Attorney, Agent, or Firm—Daniel P. Morris

[57] ABSTRACT

An optical bus for interconnecting electronic devices. The bus has a substrate with through-holes therein. An optically conductive material is disposed on one side of the substrate. The material fills the through-holes and forms a layer of predetermined thickness on this side of the substrate. In the outer surface of this layer there are facets or angled regions. The surface and facets are optically reflective. Cards or modules are optically connected by means of optical connectors to the through-holes on the opposite side of the substrate. Light emitted by the connector travels to the associated faceted surface from which it reflects towards other faceted surfaces from which it is partially transmitted and partially reflected to another connector. The arrangement permits optical communication between a plurality of electronic devices.

25 Claims, 2 Drawing Sheets

FIG. 1
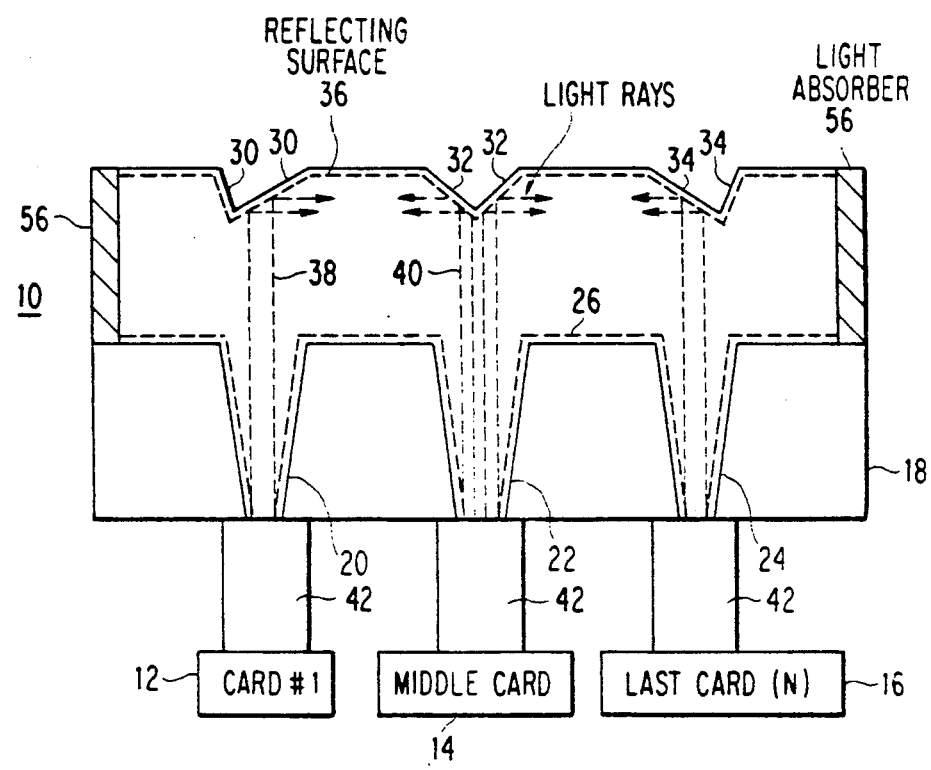
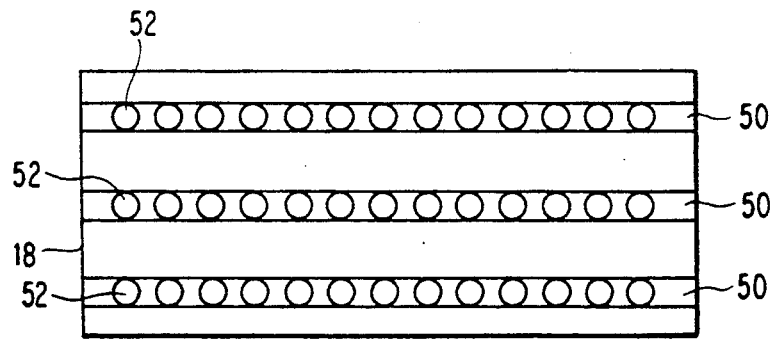
FIG. 2A
FIG. 2B

18 SUBSTRATE
26 REFECTIVE METAL COATING
20  22  24

OPTICAL GUIDE MATERIAL
28  26
18

OPTICAL BUS FOR COMPUTER SYSTEMS

BACKGROUND OF THE INVENTION

I. Field of the Invention

This invention relates to computer systems, and in particular, it relates to an optical bus structure to couple electronic devices. This invention is also directed to a method of manufacturing an optical bus that provides a system for optical connections between electronic cards or modules in a computer system.

II. Description of the Related Art

As computer systems become more complex, there is a continuing requirement for driving signals at faster clock rates while at the same time minimizing power, noise, and electro-magnetic interference (EMI). Within such systems, the computer bus forms the primary vehicle by which communication between electronic subsystems takes place. In its most basic form, the bus is traditionally a series of electrical lines interconnecting the modules in the computer. Those modules connect to the bus by means of tap lines. In this implementation, the primary bus lines will not be broken, or rooted through any of the computer modules. Communication between modules takes place through the bus.

Given current limitations in computer technology, the electrical transmission characteristics of the bus are defined by the material properties of the bus components physical geometry of the components (spacing) together with the clock speed of the signals. Those characteristics, in part generated by limitations in materials and in part by limitations in electronic components generated, determine the switching speed at which signals as well as the presence of noise within the bus conductor occurs.

The dual requirements of faster speed and lower power consumption have been considered mutually inconsistent. That is, attempts to drive signals at a faster rate carries with it an increase in power consumption together with an increase in system noise. To date, there has been no satisfactory solution for the mutually exclusive requirements of high speed data transmission, noise dissipation and reduction in power requirements.

For example, if the area of a transmission line decreases, a transmission line inductance will increase. High inductance in turn causes a large voltage drop across the line tending to degrade the signal and require more power to maintain signal level at an acceptable value. While this problem can be alleviated by the use of a transmission line of greater area, a shorter path or slower switching that solution tends to reduce overall transmission speed of data between modules.

Moreover, by electrically coupling boards to the bus, impedance matching is required. Generally, resistors are used to accomplish this matching, which in themselves, draw power thus increasing the overall power requirements of the system.

In order to avoid the problems of electrically coupling modules in a computer, attention has shifted to optical techniques of data transmission within a computer architecture. Representative is U.S. Pat. No. 4,732,466, which employs a circuit board having an optical data bus. In this system each printed circuit board includes an optical fiber network which in a composite sense forms an optical bus to interconnect computer components on the same printed circuit board. While broadly relating to the concept of optical data transmission between computer elements, the system of the '446 patent has a number of serious shortcomings. First, there is no provision in the system for minimizing optical reflections in the structure. Reflections will occur at various interfaces causing optical signals to propagate back along the waveguides. This is true whether the waveguides are glass, polymer or any other material. Such reflection seriously impacts the utility of an optical bus structure in computer applications. Reflections will most likely induce enough extraneous optical "noise" that the device would be essentially inoperative.

Another important shortcoming is available optical systems not covered by the '446 patent is the ground rule for data bus transmission to provide a uniform distribution of optical power among all opto-electronic devices. That is, in computer architecture it is important to distribute optical power from one emitter equally to various receivers. Such is required in computer bus applications where a device receiving the optical systems may be plugged into the optical bus at any point. It must receive proper optical signals at each position. This requirement in turn mandates a uniform distribution of optical power to each "tap" from the wave guide which comprises the optical bake plane.

Rather, in the '446 patent, the structure is such that the received optical signal will diminish at successive receiver according to $R(1-R)$ to the exponent N where, R is the power reflected from each splitting device and N is the number of such devices. As such, each splitter in the '446 patent will receive approximately 15% of the optical energy with the tenth opticoelectronic module receiving four times less optical signal as the second module. Such a system is essentially useless in digital signal transmission. The '446 system can not meet a standing requirement and current computer architectures that any circuit card be pluggable into any slot in a bus. Consequently, an optical bus must also distribute optical power uniformly otherwise digital signal values cannot be maintained.

Reference is made to U.S. Pat. No. 4,063,083, which is also directed to data communication between computer systems by employing an optical data bus. While employing optical paths to interconnect computer circuit elements, the '083 patent provides only for point-to-point interconnections. This is accomplished by means of having optical communication established between two points by employing arrays of light emitting diodes and photoconductors. However, in the context of computer architecture a standing requirement is to provide interconnections with multiple sources and sinks per signal line. Moreover, given the point-to-point interconnection scheme of the '083 patent, electronic selection of specific optical paths by transmitter and receiver are required. Thus, active repeaters are used on the optical communication link. Specifically, the optical signal is sensed by a photosensitive device, converted into electrical form, conducted electrically to an adjacent photoemitter and reconverted into optical form. While an optical bus is broadly used, it carries with it the expense of additional components and signaled delay which is a consequence of multiple conversions.

Other techniques have been proposed in the art for using optical couplers for purposes of data transmission. U.S. Pat. No. 4,400,054 relates to an optical coupler used to transmit data from any one of N small optical channels by funneling to a single "large" optical channel. This technique does not provide an optical interconnect scheme for purposes of computer bus applications where all optical ports must be interconnected to allow by-directional communication between any two device. That is, the system does not provide for any direct optical intercommunication between the N "small optical channels".

A different type of optical interconnect is disclosed in U.S. Pat. No. 4,838,630 by utilizing a planar volume Bragg hologram in two dimensions. This technology has no defined signal lines but rather, employs a plane volume element.

Thus, while it is apparent that within the literature there have been a variety of proposals for the use of optical data transfer in the context of computer systems, a need still exists to provide optical bus communication between computer modules.

SUMMARY OF THE INVENTION

It is an object of this invention to provide for an optical bus that accommodates high density applications in computer modules.

It is a further object of this invention to provide a high speed, low power and low noise characteristic optical bus which allows for communication between modules in a computer system.

According to a preferred embodiment of this invention, an optical bus supports optical transmission lines which connect modules in the computer. The optical lines are not broken or rooted through any one board. A user can employ the bus in either semisynchronous as well as asynchronous modes. Information from the computer modules is converted by means of optical connectors which act as transfer devices between the modules and the optical bus. In situations where the modules are optical, the connector structure is unnecessary.

In accordance with another aspect of this invention, an optical bus is manufactured as unitary structure having an asymmetric mirror arrangement which allows for direct device-to-device intercommunication.

This invention will be described in greater detail by referring to the drawing and the preferred embodiments which follow.

BRIEF DESCRIPTION OF THE DRAWING

FIG. 1 is a schematic view illustrating an asymmetric mirror arrangement of the optical bus in accordance with this invention;

FIGS. 2A and 2B are schematic top and side views respectfully of a bus having three conductors and twelve module ports.

DESCRIPTION OF THE PREFERRED EMBODIMENT

Figure 3A:
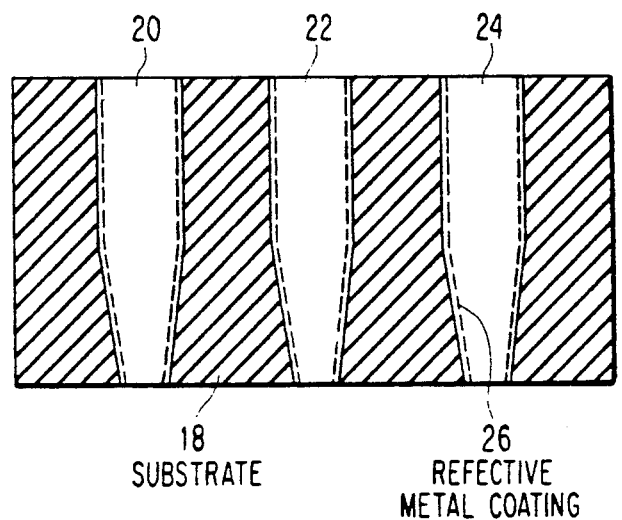
FIGS. 3A and 3B illustrate a front cross section of the optical bus having tapered vias during intermediate processing steps.

Referring now to FIG. 1, a first preferred embodiment of this invention is depicted. It will be appreciated that while illustrated in a schematic side view, the optical back plane device is three-dimensional and provides for direct communication between an array of electronic devices which are coupled to it. The bus structure 10 is used for interconnecting electronic devices such as cards or modules each containing semiconductor chips. Such are illustrated as a first card 12, a middle card 14 and a last or N th card 16. It will be appreciated that while three cards are illustrated, a number N will be coupled to the bus 10.

Also, which the cards illustrated represent one row, the invention is applicable to a number of rows of such cards or modules. The bus 10 has a substrate structure 18 having holes 20, 22 and 24, which are aligned with respective cards which are to be interconnected. An optically reflective surface 26 is used to coat the inside of the vias 20, 22 and 24. This can be a surface coating such as a metal surface layer. Alternatively. the reflective surface 26 can be the surface of the material itself, which is used to form the substrate 18 if that material is suitably reflective either naturally or by doping. One of working skill using waveguide technology will be able to suitably render the inner substrate surface reflective. Each of the through holes is filled with an optically conducting material 28 (see FIG. 3B).

As illustrated in FIG. 1, the bus 10 has a series of angled surfaces which are aligned with the respective through-holes. Those angled surfaces 30, 32 and 34 serve to reflect light from one via to another. As illustrated in FIG. 1, the mirror arrangement is asymmetric. That is, opposite the first card 12 and the last card (N) 16, the surface is angled to direct light inward to the bus. For intermediate cards 14, the reflecting surfaces are symmetrical about the aligned through-hole.

The upper surface of the bus 10 thus has a layer of optically conducting material with a reflecting surface 36. The angled portion which is aligned with each hole 20, 22 and 24 reflects light to the cards or reflects light from the cards to another of the angled surfaces. These reflections are illustrated by the ray-lines 38 and 40. With respect to the outer boundary cards, the reflection is inward. With respect to intermediate cards the reflection is by-directional.

A fraction of the light travels parallel to the surface of the reflecting surface 36 and is transmitted through the respective angled surfaces to a through-hole. A fraction of the light is thus reflected down to one of the cards.

In accordance with this invention, an electro-optical connector 42 is employed to provide the transformation between electrical data and optical data from a respective card to the optical bus. This optical coupler provides for a direct optical connection for making optical connections over relatively short distances, that is, approximately 1 centimeter or less. This device comprises a pair of members each having a plurality of light emitting and light detecting locations. The members thus operate in combination with an energy-transfer medium, that is, a technique for channeling light from the light emitting locations to the light detecting locations. The first and second members are adapted to be a reclosable connection to each other such that the light emitting locations on one member are aligned with the light detecting locations on the other member. Such provides for a direct optical connection in modular form. The connector reflects a portion of the light back to the reflecting surface while converting a portion into electrical data signals for use by the associated electronic device.

An embodiment of such a connector is found in pending patent application entitled "Electro-Optical Connectors", U.S. Pat. application No. 07/542,275 commonly assigned, filed on June 22, 1990 and expressly incorporated herein by reference.

Referring now to FIGS. 2 and 3, the method of making the optical bus 10 of FIG. 1 will be described. First, lines are machined in the surface of a suitable substrate 18. The substrate may be either metallic, such as copper, or a semiconductor such as silicon or, it may be polymeric. The sole function of the substrate is to provide a base for the optical links and connectors. Next, at predetermined locations in the substrate through-holes or vias are formed from the bottom of the lines to the other side of the substrate. FIG. 2A illustrates the lines 50 and the through-holes 52. The holes form the connecting path with the bus and the board interconnects 42. FIG. 2A and 2B illustrates a typical bus having three connectors formed by lines 50 with each connector having 12 modules ports 52.

Referring now to FIG. 3A the next step is depicted. Following machining which produces the structure of FIGS. 2A and 2B, the substrate is masked and the lines and holes are metalized with a high reflectively metal 26. This creates the mirrored walls in each of the through-holes 20, 22 and 24. It will be appreciated that this intermediate step may not be necessary in the case of substrates which are already reflective.

Figure 3B:
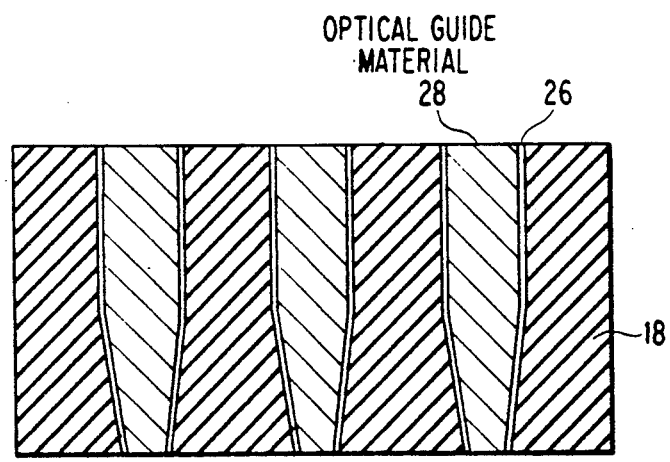

Next, a polymeric substance with suitable optical transmission characteristics is molded into the lines and holes. This is illustrated in FIG. 3B. Such a molding step can be achieved by various techniques known in the art. These include injection molding, spin coating and the use of a doctor blade. Excess surface material is removed from the substrate surface by a suitable machining operation such as micromilling. As illustrated in the figures, each of the vias 20, 22 and 24 is tapered. The process of producing the substrate can be accomplished by lithographic techniques such as the use of photosensitive polymers, (SU 8) by which masking. etching and filling can be used to define the basic back plane structure.

Referring again to FIG. 1, the operation of the device is depicted for an asymmetric mirror arrangement. As indicated, interconnect devices capable of reflecting a portion of the light signal must be inserted into each of the lines. Such devices must have the capability to divert light coming from the module driver in both directions. Moreover, depending on the physical location of the particular slot in the bus 10, a portion of the light energy must be diverted in a particular manner. That is, for slots 20 and 24 at both ends all of the received energy must be deflected up and all of the transmitted energy must be channeled in one direction. Such is illustrated in FIG. 1. For slots in the middle however, the energy must be distributed equally in all directions. By using asymmetric mirror arrangements, as illustrated in FIG. 1, this is accomplished. The respective areas of the mirrors formed by the reflecting surfaces 36 is varied as a function of the desired light transmittal. Also, as illustrated in FIG. 1 at each end of the bus optical black bodies 56 are employed to absorb all radiation that reaches the physical end of the bus line. These may be wavelength specific light absorbers. Such devices avoid reflectances that go back through the guides. Such optical black bodies acting as light absorbers are illustrated in FIG. 1 as planar elements 56.

A variation of the embodiment illustrated in FIG. 1 is to employ holograms incorporated into the top of the optical guides over the vias. These devices couple a certain amount of energy into the via or into the beam. Such devices can be incorporated into the guide material 28 over the vias by laser ablation, micromilling, photolithography or other known techniques.

Accordingly, by this invention an optical bus provides for direct interconnection between electronic devices in a computer system. It is apparent that modifications of this invention may be made without departing from the essential scope thereof.

Having described the invention, we claim:

1. A computer bus structure comprising:
   a substrate having a pair of opposed surfaces,
   a plurality of thru-holes in said substrate opening to one of said surfaces,
   means defining an optically transmitting layer on walls of said thru-holes and on said opposed surfaces,
   a plurality of angled sections on the other of said surfaces, said angled sections respectively positioned with said thru-holes, an optical-electrical interface connected to said thru-holes, and a plurality of electronic devices mounted to said one of said surfaces and receiving signals from said optical-electrical interface whereby light transmitted from one optical-electrical interface is reflected by one of said angled sections to another of said optical-electrical interfaces and converted into an electrical signal for use by the associated electronic device.

2. The bus structure of claim 1 further comprising: means at end of said substrate to absorb light.

3. The bus structure of claim 1 further comprising optical guide material filling each of said thru-holes.

4. The bus structure of claim 1 wherein said substrate is a metallic material.

5. The bus structure of claim 1 wherein said substrate is a semiconductor material.

6. The bus structure of claim 1 wherein said substrate is a polymeric material.

7. The bus structure of claim 1 wherein said substrate comprises N rows of thru-holes, each row containing a plurality of thru-holes.

8. The bus structure of claim 1 wherein said plurality of thru-holes comprises at least three and wherein said angled sections comprise a asymmetric mirrors positioned over each end thru-hole and a symmetric mirror positioned over and aligned with each thru-hole between said end thru-holes.

9. The bus structure of claim 1 wherein said means defining an optically transmitting layer comprises a layer of a highly reflective metal coating walls of said thru-holes and said opposed surfaces.

10. The bus structure of claim 1 wherein said substrate comprises a material having a high reflectivity and said means defining an optically transmitting layer comprises substrate faces of said material.

11. An optical bus for interconnecting a plurality of electronic components comprising:
   a wave guide substrate having opposed major surfaces,
   waveguide thru-holes in said substrate for guiding light to and from said electronic components,
   angled section positioned opposite said thru-holes for transmitting light from one thru-hole in a direction toward another angle section, and
   optical-electronic interfaces connecting said waveguide thru-holes to said electronic devices such that light transmitted from one optical-electronic interface is reflected by associated angled sections to be directed to another optical-electrical interface for conversion into an electrical signal useable by the associated electronic component.

12. The bus structure of claim 11 further comprising: means at end of said substrate to absorb light.

13. The bus structure of claim 11 further comprising optical guide material filling each of said thru-holes.

14. The bus structure of claim 11 wherein said substrate is a metallic material.

15. The bus structure of claim 11 wherein said substrate is a semiconductor material.

16. The bus structure of claim 11 wherein said substrate is a polymeric material.

17. The bus structure of claim 11 wherein said substrate comprises N rows of thru-holes, each row containing a plurality of thru-holes.

18. The bus structure of claim 11 wherein said plurality of thru-holes comprises at least three and wherein said angled sections comprise a asymmetric mirrors positioned over each end thru-hole and a mirror of suitable symmetry positioned over and suitably aligned with each thru-hole between said end thru-holes.

19. The bus structure of claim 11 wherein said means defining an optically transmitting layer comprises a layer of a highly reflective metal coating walls of said thru-holes and said opposed surfaces.

20. The bus structure of claim 11 wherein said substrate comprises a material having a high reflectivity and said means defining an optically transmitting layer comprises substrate faces of said material.

21. The bus structure of claim 8 wherein said angled sections comprising asymmetric mirrors are replaced by holographic gratings suitably aligned over each through-hole to distribute signals to and from said optical-electrical interfaces.

22. The bus structure of claim 11 wherein said angled sections comprising asymmetric mirrors are replaced by holographic gratings suitably aligned over each through-hole to distribute signals to and from said optical-electrical interfaces.

23. The bus structure of claim 11 wherein said waveguides are defined on said substrate on same side as said optical-electrical interface thereby eliminating necessity of said thru-holes.

24. The bus structure of claim 23 wherein said waveguides are defined with said asymmetric mirrors positioned under each said optical-electrical interface to distribute said signals.

25. The bus structure of claim 23 wherein said waveguides are defined with said holographic gratings aligned with said optical-electrical interfaces to distribute said signals.

* * * * *